Aug. 3, 1926.
H. D. KAPPELMAN
1,595,005
SPEED REGULATOR
Filed Sept. 14, 1925   4 Sheets-Sheet 1
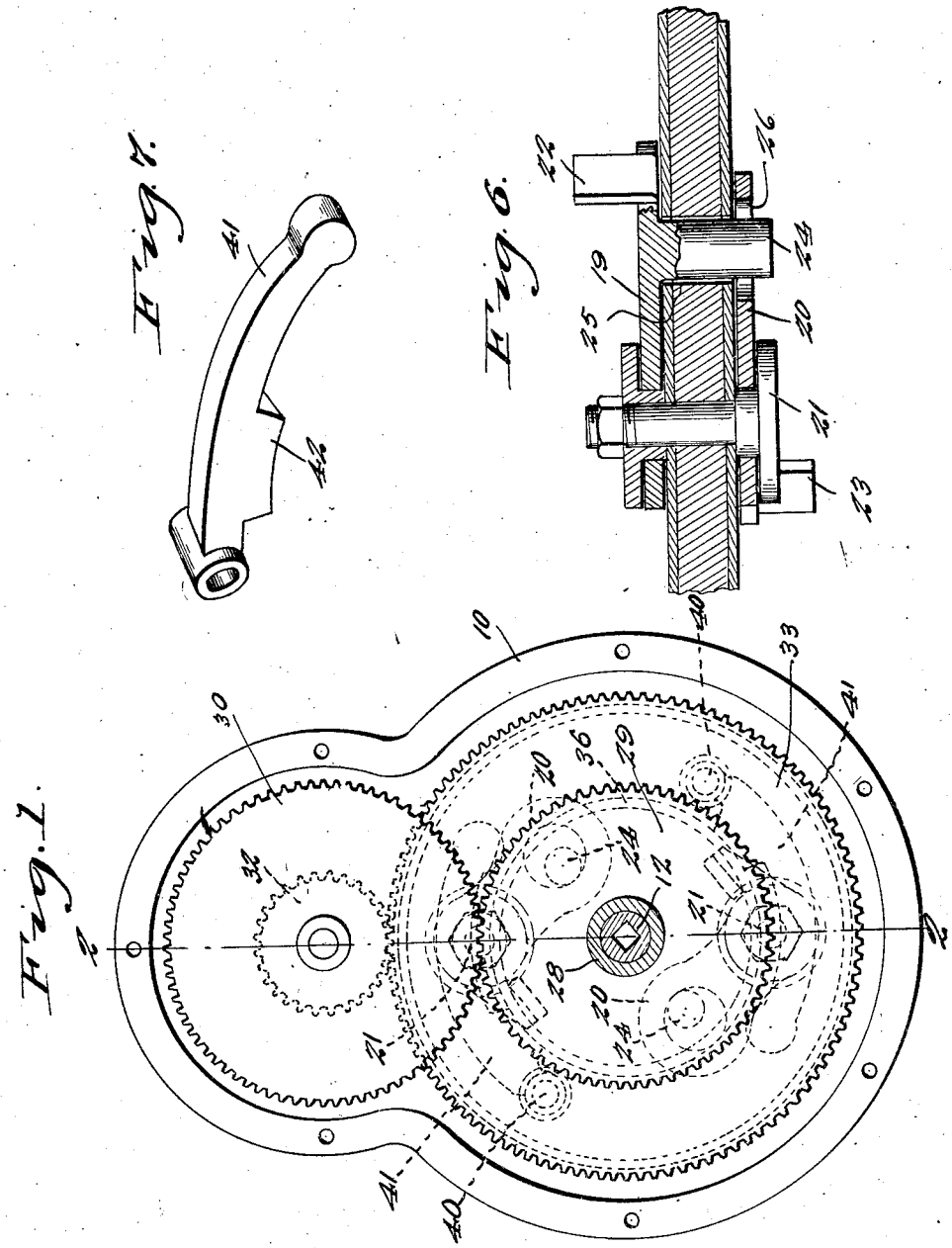

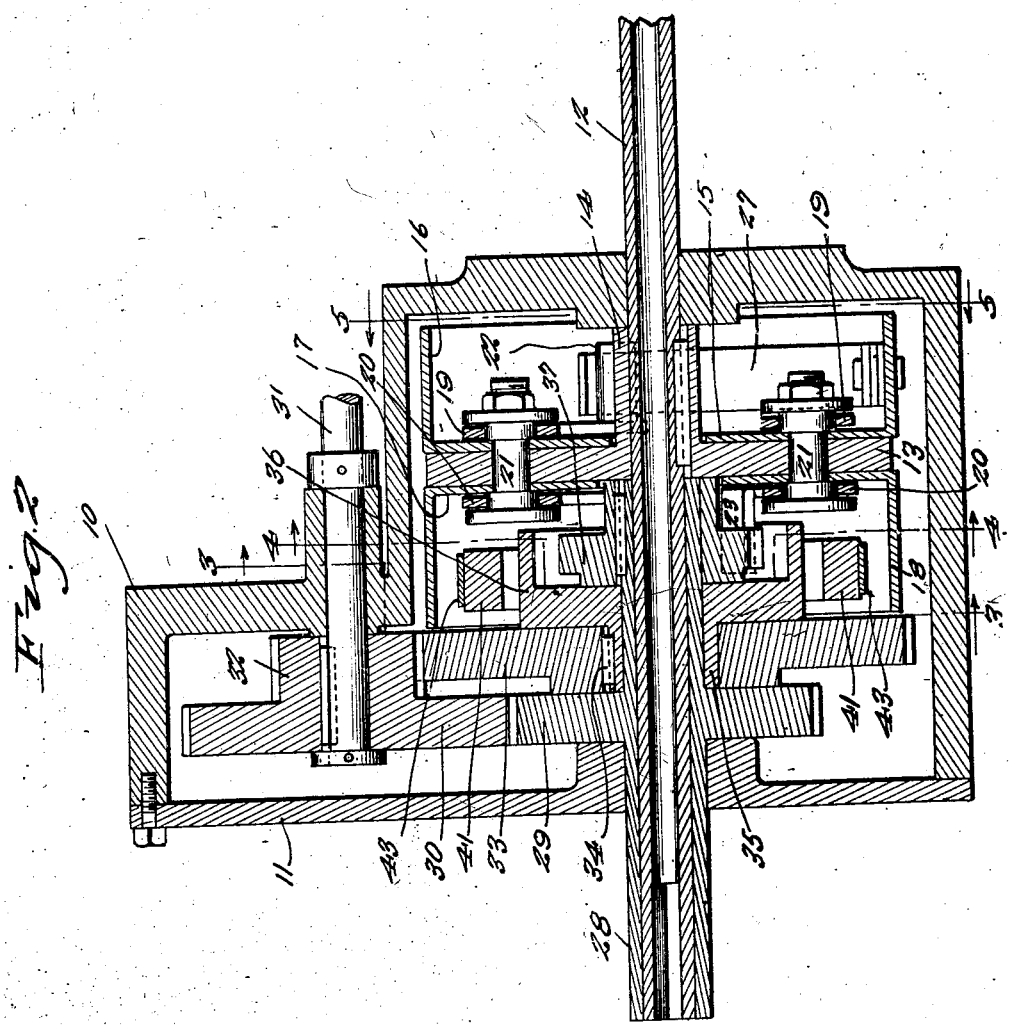

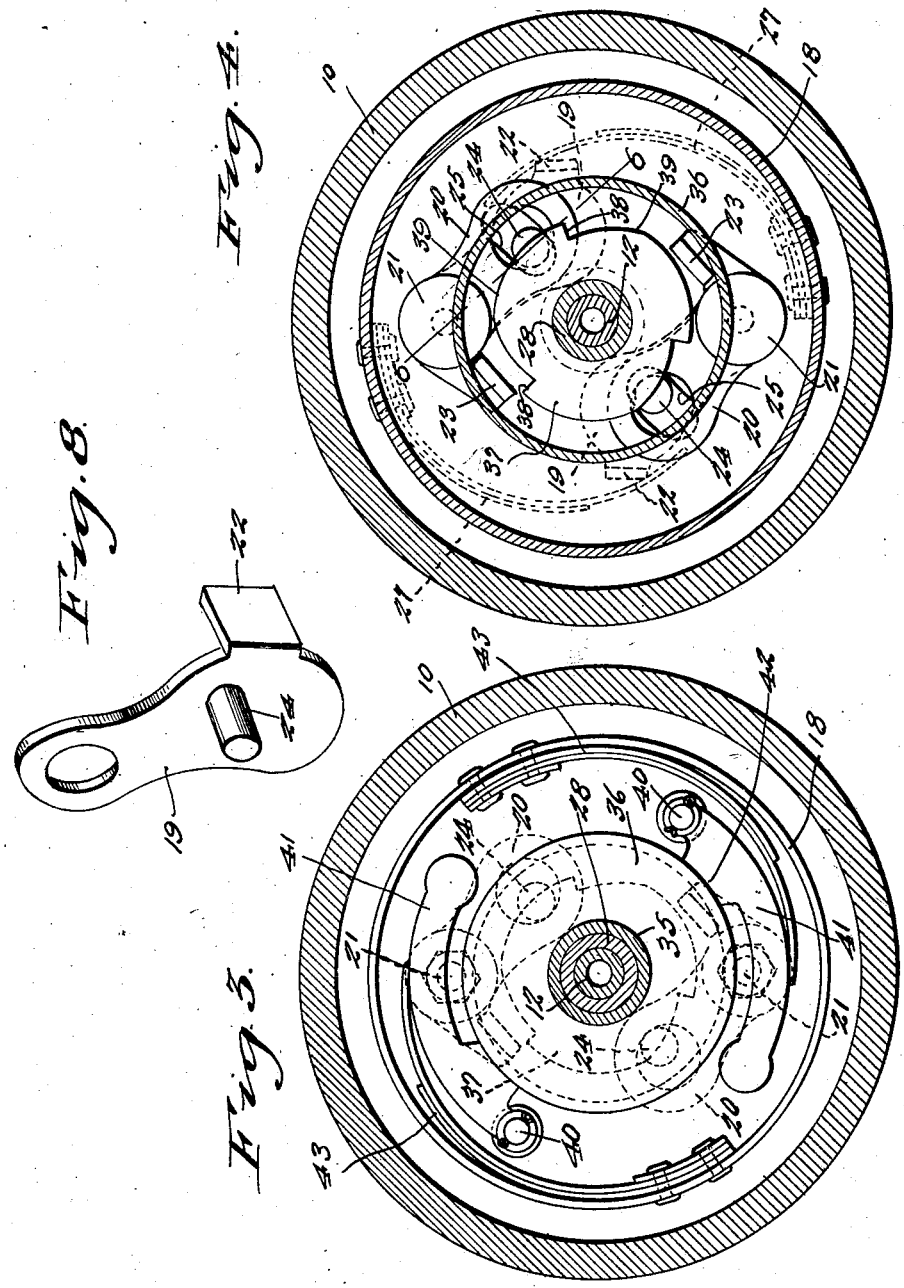

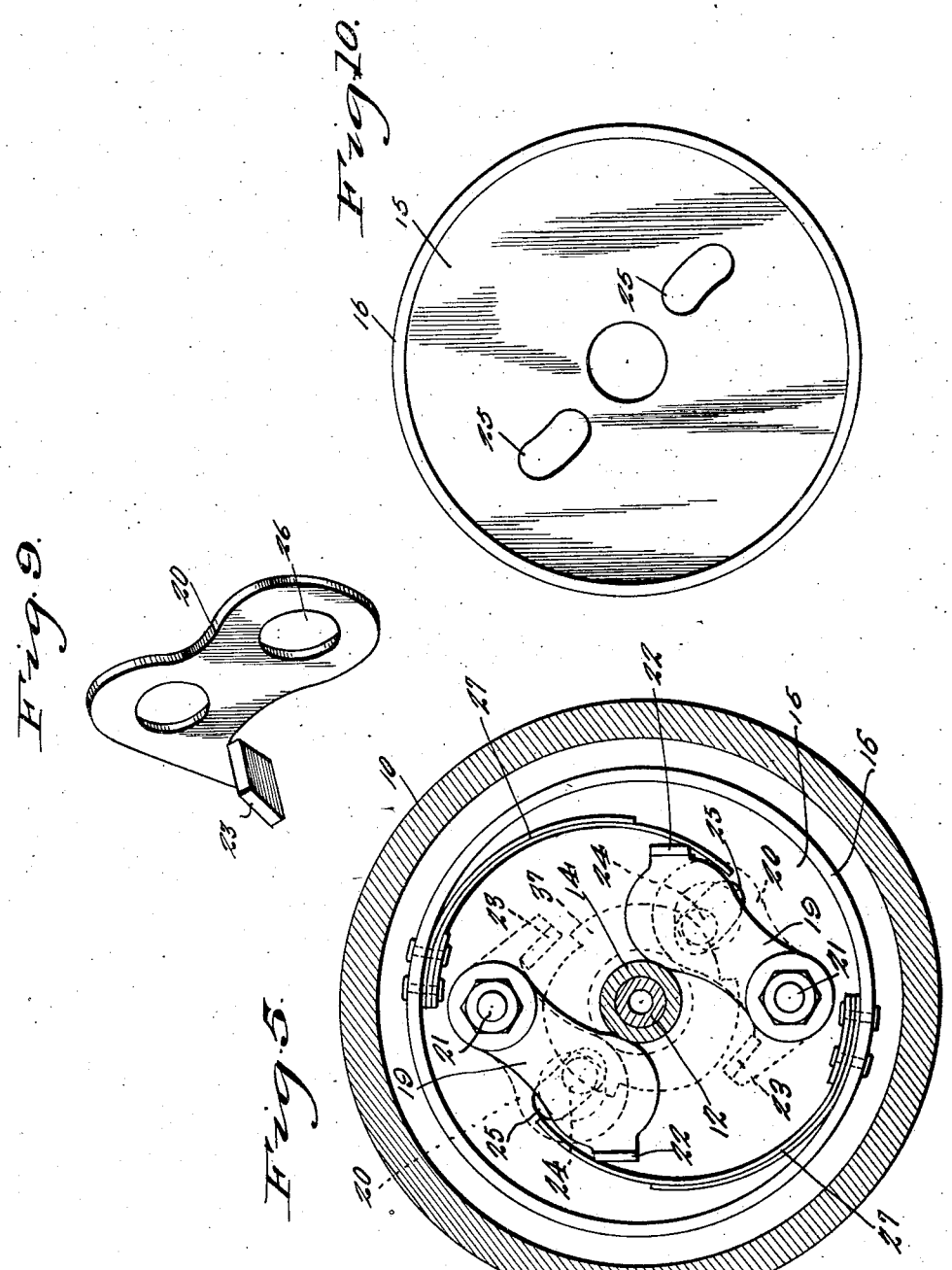

Patented Aug. 3, 1926.

1,595,005

UNITED STATES PATENT OFFICE.

HENRY D. KAPPELMAN, OF BILLINGS, MONTANA.

SPEED REGULATOR.

Application filed September 14, 1925. Serial No. 56,341.

This invention relates to transmission mechanism or drive devices and has for its object the provision of a novel mechanism by means of which a driven shaft may be operated at a certain desired speed, the speed being controlled automatically in accordance with the rotation of the driven shaft, the invention being particularly well adapted for use in driving a generator or the like whereby when the driven shaft rotates above a certain predetermined speed the drive shaft will be automatically locked thereto for rotation therewith.

An important object is to provide an automatic regulator for the speed of a driven shaft such as that of a generator or the like whereby the driven shaft will be rotated at a requisite speed even though the speed of the driven shaft of the regulator be greatly reduced, while at the same time when the speed of the driven shaft is increased greatly the drive shaft will be automatically locked thereto.

An additional object is to provide a device of this character which will be comparatively simple and inexpensive in manufacture, easy to install, positive in action, efficient and durable in service, and a general improvement in the art.
With the above and other objects and advantages in view, the invention consists in the details of construction and arrangement of parts to be hereinafter more fully described and claimed, and illustrated in the accompanying drawings in which:—

Figure 1 is an elevation of the device with one end plate of the casing removed and the shaft in section.

Figure 2 is a section taken on the line 2—2 of Figure 1.

Figure 3 is a cross section on the line 3—3 of Figure 2.

Figure 4 is a cross section on the line 4—4 of Figure 2.
Figure 5 is a cross section on the line 5—5 of Figure 2.

Figure 6 is a detail section on the line 6—6 of Figure 4.

Figure 7 is a detail perspective view of one of the fly weights, and

Figure 8 is a detail perspective view of one of the pawls.

Figure 9 is a detail perspective view of another one of the pawls.
Figure 10 is a detail elevation of one of the cup-like members.

Referring more particularly to the drawings the numeral 10 designates a casing which may be of any desired or necessary size, shape and material and which is provided with a removable end plate 11. Journaled through the casing is a shaft 12 constituting the driven shaft and keyed or otherwise secured thereon is a disk 13 having a hub portion 14. The shaft 12 is driven by any suitable transmission mechanism. Mounted against one face of this disk is a cuplike member 15 having a flange 16 at its outer periphery, and disposed against the opposite face is a similar cup member 17 having a flange 18 at its outer periphery. The flanges 16 and 18 extend in opposite directions.

Disposed against the outer face of the cup member 15 are dogs 19 and disposed against the corresponding face of the cup member 17 are dogs 20. These dogs are all held in place by pivot members 21 which pass therethrough and through the disk 13. While a certain type of pivot member is disclosed it is quite obvious that there may be variations in this respect. The dogs 19 and 20 are formed respectively with laterally extending lugs 22 and 23 which of course extend in opposite directions, and the dogs 19 are formed with pins 24 projecting in a direction opposite the dogs 22, passing through slots 25 in the disk and cup members and passing through holes 26 in the dogs 20. Secured to the inner periphery of the flange 16 of the cup member 15 are curved leaf springs 27 which are engaged by the lugs 22 for normally urging the dogs 19 in one direction. As these dogs 19 are connected with the dogs 20 by means of the pins 24 engaging within the holes 26 it is quite evident that the dogs 20 will be controlled in the same manner as the dogs 19.

The numeral 28 designates the drive shaft which surrounds and which is rotatable upon the shaft 12 and independently thereof. This shaft 28 is intended to be coupled directly to the generator or the like to be operated, and carries a gear 29 meshing with a gear 30 on a counter shaft 31 journaled in the casing in parallel relation to the drive and driven shafts. The gear 30 carries a gear 32 meshing with a gear 33 keyed or otherwise secured at 34 upon the hub 35 of a drum 36. Keyed or otherwise secured upon the drive shaft 28 is a clutch element 37 of a ratchet-like nature having shoulders 38 and curved or cam surfaces 39 therebetween.

Located within the cup member 17 and pivoted thereto as shown at 40 are fly weights 41 formed with shoe portions 42 adapted to bear upon the drum 36 and urged normally into engagement therewith by means of leaf springs 43 secured to the inner periphery of the flange 18 of the cup member 17.

In the operation, it will be observed that when the driven shaft 12 is rotated the intermeshing gears 29 and 30 and 32 and 33 will be effected by the rotation of the drum 36 and as the shoe portions 42 of the fly weights are in engagement with the drum and as these fly weights are carried by the disk 13 secured to the driven shaft 12, it is obvious that the drive shaft 28 will be rotated at a speed greater than that of the driven shaft 12, the relation depending upon the ratio of the gears 32 and 33. When the speed of the driven shaft 12 is increased and reaches a certain predetermined rate, the fly weights 41 will swing outwardly under the influence of centrifugal force and the shoe portions 42 will disengage the drum 36, thus breaking the drive connection. At the same time, the dogs 19 and 20 will swing outwardly under the influence of centrifugal force and against the resistance of the springs 27. As the dogs 19 and 20 are connected for simultaneous movement, it will be observed that the lugs 23 of the dogs 20 will move toward the axis of the drive and driven shafts and will engage with the shoulders 38 on the clutch member 37. When this occurs, it is obvious that the drive shaft and driven shafts will be locked together for rotation at the same speed, thus giving a direct drive. When the speed of rotation of the driven shaft increases, the dogs engage the clutch member and the fly weights with the shoe portions thereon disengages the drum for automatically shifting the drive connection and decreasing the speed. It is believed that the construction, operation, general utility and advantages of the mechanism will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. A speed regulating mechanism comprising the combination with drive and driven shafts, of a friction drum increasing gearing operated by the driven shaft through the friction drum, a support carried by the driven shaft, inwardly spring pressed fly weights carried by the support and cooperating with said drum for providing a drive connection between the drive and driven shafts at certain speeds, a clutch member carried by the drive shaft, and pivoted spring pressed dogs on the support coacting with said clutch member for providing a direct drive connection at higher speeds of the driven shaft.

2. In a mechanism of the character described, a casing made to contain oil for lubrication, coaxially arranged drive and driven shafts journaled within the casing, increasing gearing within the casing connected with the drive shaft, a drum connected with the increasing gearing and rotating at a reduced speed with respect to the drive shaft, a disk within the casing on the driven shaft, fly weights carried by the disk and coacting with the drum, a clutch member of a ratchet nature on the drive shaft, and dogs pivoted on the disk coacting with said clutch member.

3. In a mechanism of the character described, a casing, coaxially arranged drive and driven shafts journaled within the casing, increasing gearing within the casing connected with the drive shaft, a drum connected with the increasing gearing and rotating at a reduced speed with respect to the drive shaft, a disk within the casing on the driven shaft, fly weights carried by the disk and coacting with the drum, a clutch member of a ratchet nature on the drive shaft, dogs pivoted on one side of the disk and having lateral lugs coacting with said clutch member, pivoted dogs located at the other side of the disk and operatively connected with the first-named dogs, lateral lugs on the second-named dogs, and leaf springs engaging the second named lugs for normally swinging all of the dogs inwardly.

4. In a speed regulating mechanism, the combination with the drive and driven shafts, of a friction drum, increasing gearing operated by the driven shaft through the friction drum, a support carried by the driven shaft, normally spring pressed means carried by the support cooperating with the drum for providing a drive connection between the drive and driven shafts at certain speeds, a clutch member carried by the drive shaft, and means carried by said support and coacting with said clutch member for providing a direct drive connection at higher speeds of the driven shaft.

In testimony whereof I affix my signature.

HENRY D. KAPPELMAN.